(12) United States Patent
Daniel et al.

(10) Patent No.: US 9,767,499 B2
(45) Date of Patent: Sep. 19, 2017

(54) SUPPLY CHAIN ORCHESTRATION SYSTEM WITH CONFIGURE-TO-ORDER ITEM MATCHING

(71) Applicant: Oracle International Corporation, Redwood Shores, CA (US)

(72) Inventors: Thomas Daniel, Austin, TX (US); Kshitij Ranjan, Dublin, CA (US); William Brand, Tewksbury, MA (US); Michael Lizio, Portland, OR (US); Stephanie Merenda, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 284 days.

(21) Appl. No.: 14/040,631

(22) Filed: Sep. 28, 2013

(65) Prior Publication Data
US 2014/0095343 A1    Apr. 3, 2014

Related U.S. Application Data

(60) Provisional application No. 61/707,668, filed on Sep. 28, 2012.

(51) Int. Cl.
*G06Q 30/00* (2012.01)
*G06Q 30/06* (2012.01)
(Continued)

(52) U.S. Cl.
CPC ............ *G06Q 30/0621* (2013.01); *G06F 7/02* (2013.01); *G06F 17/30* (2013.01);
(Continued)

(58) Field of Classification Search
CPC ........ G06C 30/0601–30/0645; G06C 30/0621; G06C 30/0635; G06C 30/0603;
(Continued)

(56) References Cited

U.S. PATENT DOCUMENTS 5,307,261 A * 4/1994 Maki .................. G06Q 10/0875
                                                700/107
6,868,401 B1    3/2005 Carpenter et al.
(Continued)

OTHER PUBLICATIONS

Keyword-based Search in a Relational Database, Daniel Suelmann. Aug. 2009 (Aug. 2009). Accessed via http://www.let.rug.nl/alfa/ba/DanielSuelmann.pdf.*

(Continued)

*Primary Examiner* — Resha Desai
*Assistant Examiner* — Allison Wood
(74) *Attorney, Agent, or Firm* — Miles & Stockbridge P.C.

(57) ABSTRACT

A system is provided that searches and matches data. The system receives a payload including one or more data values, where the one or more data values represent an item configuration. The system further generates a match key for the payload that includes at least one data value of the one or more data values. The system further compares the match key with one or more match keys stored in a match repository. The system further retrieves a configuration item identity from the match repository when the match key matches a match key stored in the match repository, where the configuration item identity represents a previously ordered item configuration. The system further generates a new configuration item identity when the match key does not match a match key stored in the match repository, where the new configuration item identity represents the item configuration.

21 Claims, 10 Drawing Sheets

(51) Int. Cl.
*G06Q 10/06* (2012.01)
*G06F 7/02* (2006.01)
*G06F 17/30* (2006.01)

(52) U.S. Cl.
CPC ... *G06Q 10/06315* (2013.01); *G06Q 30/0603* (2013.01); *G06Q 30/0633* (2013.01); *G06Q 30/0635* (2013.01)

(58) Field of Classification Search
CPC . G06C 30/0633; G06F 17/30; G06F 17/3001; G06F 7/02
USPC .............. 705/26.1–27.2, 26.5, 26.8, 26.81; 707/770, 706
See application file for complete search history.

(56) References Cited

U.S. PATENT DOCUMENTS

| | | | |
|---|---|---|---|
| 6,999,965 B1 * | 2/2006 | Cesarotti | G06Q 10/06 |
| 7,590,587 B2 | 9/2009 | Duquette | |
| 7,720,809 B2 | 5/2010 | Knudsen et al. | |
| 7,761,357 B2 | 7/2010 | Yu et al. | |
| 7,983,971 B1 | 7/2011 | McLuckie et al. | |
| 8,326,754 B2 | 12/2012 | Bandych et al. | |
| 8,326,773 B1 | 12/2012 | Bellamy et al. | |
| 8,402,064 B2 | 3/2013 | Addala et al. | |
| 8,412,621 B2 | 4/2013 | Madhavan et al. | |
| 8,914,728 B2 * | 12/2014 | Stephen | 715/734 |
| 2002/0188702 A1 | 12/2002 | Short, III et al. | |
| 2003/0014324 A1 * | 1/2003 | Donovan | A61K 8/02 705/26.43 |
| 2003/0172051 A1 * | 9/2003 | Ouchi | G06Q 10/087 |
| 2004/0138954 A1 | 7/2004 | Norton et al. | |
| 2004/0267674 A1 | 12/2004 | Feng et al. | |
| 2005/0203809 A1 * | 9/2005 | Stone | G06Q 10/087 705/7.19 |
| 2005/0218221 A1 | 10/2005 | Nark et al. | |
| 2007/0288367 A1 * | 12/2007 | Krishnamoorthy | G06Q 20/102 705/40 |
| 2008/0103871 A1 | 5/2008 | Ruehl et al. | |
| 2008/0313024 A1 | 12/2008 | Kunichika et al. | |
| 2009/0307152 A1 | 12/2009 | Gogna et al. | |
| 2009/0319546 A1 * | 12/2009 | Shaik | G06F 17/30569 |
| 2010/0049634 A1 | 2/2010 | Gogna et al. | |
| 2010/0161364 A1 * | 6/2010 | Lokowandt | G06Q 10/0631 705/7.12 |
| 2010/0191562 A1 | 7/2010 | McFarland, Jr. et al. | |
| 2010/0217692 A1 | 8/2010 | Goodbody et al. | |
| 2010/0257082 A1 | 10/2010 | Foster | |
| 2010/0332401 A1 * | 12/2010 | Prahlad | G06F 17/3002 705/80 |
| 2011/0202529 A1 * | 8/2011 | Waschke | G06F 8/71 707/737 |
| 2011/0218813 A1 | 9/2011 | Addala et al. | |
| 2011/0218842 A1 | 9/2011 | Addala et al. | |
| 2011/0218921 A1 | 9/2011 | Addala et al. | |
| 2011/0218922 A1 | 9/2011 | Addala et al. | |
| 2011/0218923 A1 | 9/2011 | Addala et al. | |
| 2011/0218924 A1 | 9/2011 | Addala et al. | |
| 2011/0218925 A1 | 9/2011 | Addala et al. | |
| 2011/0218926 A1 | 9/2011 | Addala et al. | |
| 2011/0218927 A1 | 9/2011 | Addala et al. | |
| 2011/0219218 A1 | 9/2011 | Addala et al. | |
| 2011/0249612 A1 | 10/2011 | Kubo et al. | |
| 2011/0257082 A1 | 10/2011 | Levin et al. | |
| 2012/0089486 A1 | 4/2012 | Mahakian et al. | |
| 2012/0124584 A1 | 5/2012 | Addala et al. | |
| 2012/0259677 A1 | 10/2012 | Bennett et al. | |
| 2013/0197976 A1 | 8/2013 | Mahakian et al. | |

OTHER PUBLICATIONS

Virtual Trader Overview, "Virtual Trader: Rule based solution to bridge the functionality gaps within ERP solutions", http://www.virtualtrader.net/product_functionality.php, last downloaded Aug. 15, 2013.
Swanand Sahasrabuddhe, "System Separation Approach a Methodology for Planning Systems", Infosys, http://www.infosys.com/supply-chain/white-papers/Documents/system-separation-approach.pdf, Nov. 2008.
A.T. Kearney, "Integrated Value Chains in Aerospace and Defense", http://www.aia-aerospace.org/assets/smc_wp-valuechains.pdf, 2008.
Ryszard Barcik et al., "E-Logistics—Aspects of Functioning", http://www.opf.slu.cz/aak/2012/01/Barcik.pdf, last downloaded Aug. 15, 2013.
Arkieva, "Arkieva™ Solutions Overview", http://www.arkieva.com/Files/Admin/ArkievaSolutionsOverview.pdf, last downloaded Aug. 15, 2013.
David Lucking-Reiley et al., "Business-to-Business Electronic Commerce", Working Paper No. 00-W16, http://www.accessecon.com/pubs/VUECON/vu00-w16.pdf, Jun. 2000.
Sarita Sridharan, U.S. Appl. No. 13/477,591, filed May 22, 2012.
Venkatesh Malapati, U.S. Appl. No. 13/535,836, filed Jun. 28, 2012.
Shyam Sundar Santhanam et al., U.S. Appl. No. 14/028,686, filed Sep. 17, 2013.
Karthik Natarajan et al., U.S. Appl. No. 14/032,268, filed Sep. 20, 2013.
Karthik Natarajan et al., U.S. Appl. No. 14/034,683, filed Sep. 24, 2013.
Karthik Natarajan et al., U.S. Appl. No. 14/034,792, filed Sep. 24, 2013.
Kalyana Chakravarthy Dande et al., U.S. Appl. No. 14/036,063, filed Sep. 25, 2013.
Kalyana Chakravarthy Dande et al., U.S. Appl. No. 14/036,169, filed Sep. 25, 2013.
Balaji Duvaragamani et al., U.S. Appl. No. 14/040,627, filed Sep. 28, 2013.

* cited by examiner

SUPPLY CHAIN ORCHESTRATION SYSTEM WITH CONFIGURE-TO-ORDER ITEM MATCHING

CROSS-REFERENCE TO RELATED APPLICATIONS

This application claims priority of U.S. Provisional Patent Application Ser. No. 61/707,668, filed on Sep. 28, 2012, the subject matter of which is hereby incorporated by reference.

FIELD

One embodiment is directed to a computer system, and more particularly, to a computer system that orchestrates supply chain processes.

BACKGROUND

Today, enterprise resource planning ("ERP") software typically utilizes the Extensible Markup Language ("XML"), which is a universally accepted format for representing structured data in textual form. XML is widely adopted in many enterprise databases, most particularly in databases and applications connected to the World Wide Web. The manipulation and exchange of structured data (e.g., "search and match") can often be challenging as the data is traditionally represented in platform or program dependent document formats. XML provides a set of rules and guidelines for designing text formats for such data. These XML test formats can be unambiguous, platform-independent, and extensible.

Some existing ERP applications also have the ability to allow customers to select various options when purchasing an item. For example, a customer of an ERP user can order a laptop or desktop computer, and can have the option of choosing a monitor size, a memory size, a mouse, an installed software suite, etc. Today, many ERP systems that manage the customer's order will create multiple identities to store each configuration ordered by different customers. In the aforementioned example, the ERP application may create an identity for each laptop or desktop configuration. As more and more configurations are ordered by customers, an item master list can continue to grow, occasionally resulting in an enormous item master list.

SUMMARY

One embodiment is a system that searches existing configurations and matches a current customer order with existing data. The system receives a payload including one or more data values, where the one or more data values represent an item configuration. The system further generates a match key for the payload that includes at least one data value of the one or more data values. The system further compares the match key for the current customer order with one or more match keys stored in a match repository. The system further retrieves a configuration item identity from the match repository when the match key matches a match key stored in the match repository, where the configuration item identity represents a previously ordered item configuration. The system further generates a new configuration item identity when the match key does not match any match key stored in the match repository, where the new configuration item identity represents the item configuration.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

According to an embodiment, a supply chain orchestration system is provided that can search and match records in a language utilizing nested fields, such as XML and relational database management system ("RDBMS") storage. An indexing and searching engine can be provided that constructs an improved full-text search index on input XML data and then performs searching using an RDBMS index. The indexing and searching engine can support exact matches and partial matches. More specifically, a customer can select from various configuration options for a customized order of an item, such as a configure-to-order item. The configuration options can be captured within an item configuration, and the item configuration can be sent to the supply chain orchestration system. The supply chain orchestration system can implement a searching and matching process that determines if an item with the exact set of configuration options (i.e., an item configuration) was previously ordered. If a match is found, then the supply chain orchestration system can return an existing configuration item identity for scheduling and order fulfillment. If a match is not found, the supply chain orchestration system can create a new item configuration (including the base item and any configuration options) as well as a new configuration item identity. In both of these cases, the supply chain orchestration system can return a configuration item identity to an order orchestration system for scheduling and order fulfillment.

As previously described, typical ERP software typically relies upon XML for representing structured data in textual form. However, typical ERP systems do not provide an efficient way to search and match XML and RDBMS at the same time. Since XML represents structure data in a textual format, XML typically only lends itself to a slow, sequential scan of the text in a search of a particular record. Standard full-text indexing provides only an incomplete solution because the field context of each word is not preserved. As is discussed below in greater detail, the indexing and searching engine provided by the supply chain orchestration system can resolve the aforementioned problems of searching and matching between XML and RDBMS.

Figure 1:
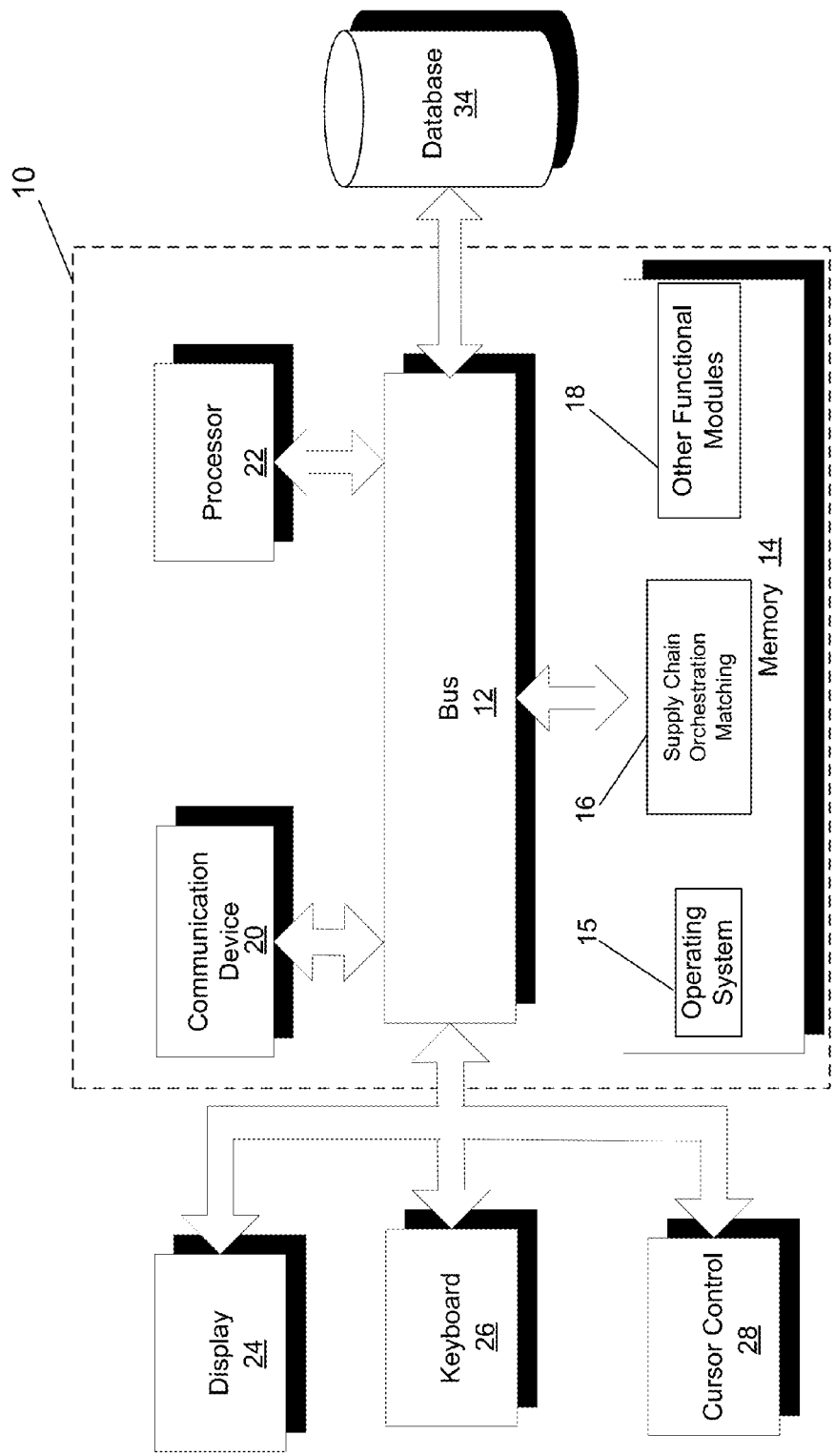
FIG. 1 illustrates a block diagram of a system that can implement an embodiment of the invention.

FIG. 1 illustrates a block diagram of a supply chain orchestration system 10 that may implement one embodiment of the invention. Supply chain orchestration system 10 includes a bus 12 or other communications mechanism for communicating information between components of supply chain orchestration system 10. Supply chain orchestration system 10 also includes a processor 22, operatively coupled to bus 12, for processing information and executing instructions or operations. Processor 22 may be any type of general or specific purpose processor. Supply chain orchestration system 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. Supply chain orchestration system 10 further includes a communication device 20, such as a network interface card or other communications interface, to provide access to a network. As a result, a user may interface with supply chain orchestration system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with supply chain orchestration system 10.

According to one embodiment, memory 14 can store software modules that may provide functionality when executed by processor 22. The modules can include an operating system 15, a supply chain orchestration matching module 16, as well as other functional modules 18. Operating system 15 can provide an operating system functionality for supply chain orchestration system 10. Supply chain orchestration matching module 16 can provide functionality for searching and matching data, as is described in more detail below. In certain embodiments, supply chain orchestration matching module 16 can comprise a plurality of modules that each provide specific individual functionality for searching and matching data. Supply chain orchestration system 10 can also be part of a larger system. Thus, supply chain orchestration system 10 can include one or more additional functional modules 18 to include the additional functionality. For example, functional modules 18 may include modules that provide additional functionality, such as an "Oracle Fusion Applications" product from Oracle Corporation, that can provide ERP functionality. In another example, functional modules 18 may include ERP modules of an ERP system, where an ERP system is a computer system that integrates several data sources and processes of an organization into a unified system.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

As described in this application, a supply request (also identified as a "request") is a request to either make, buy, or transfer a supply (i.e., one or more items or products). An internal system or application is a system or application that resides within an ERP instance. An external system or application is a system or application that is a separate instance of an ERP system or application. A supply request can be sent by an internal (within the boundaries of a single instance ERP) or external (a second, separate instance of a different ERP system or application) supply request system. A supply order (also identified as an "order") is an order to make, buy, or transfer the supply. A supply order can be orchestrated by a supply chain orchestration system, where the supply chain orchestration system can identify one or more internal or external supply execution systems that can satisfy or fulfill the request for the supply. An execution system can be a purchasing system that can purchase the supply, a manufacturing system that can make the supply, or an inventory system that can effectuate an internal or external transfer of the supply. The supply chain orchestration system can orchestrate and manage the overall supply creation process.

Figure 2:
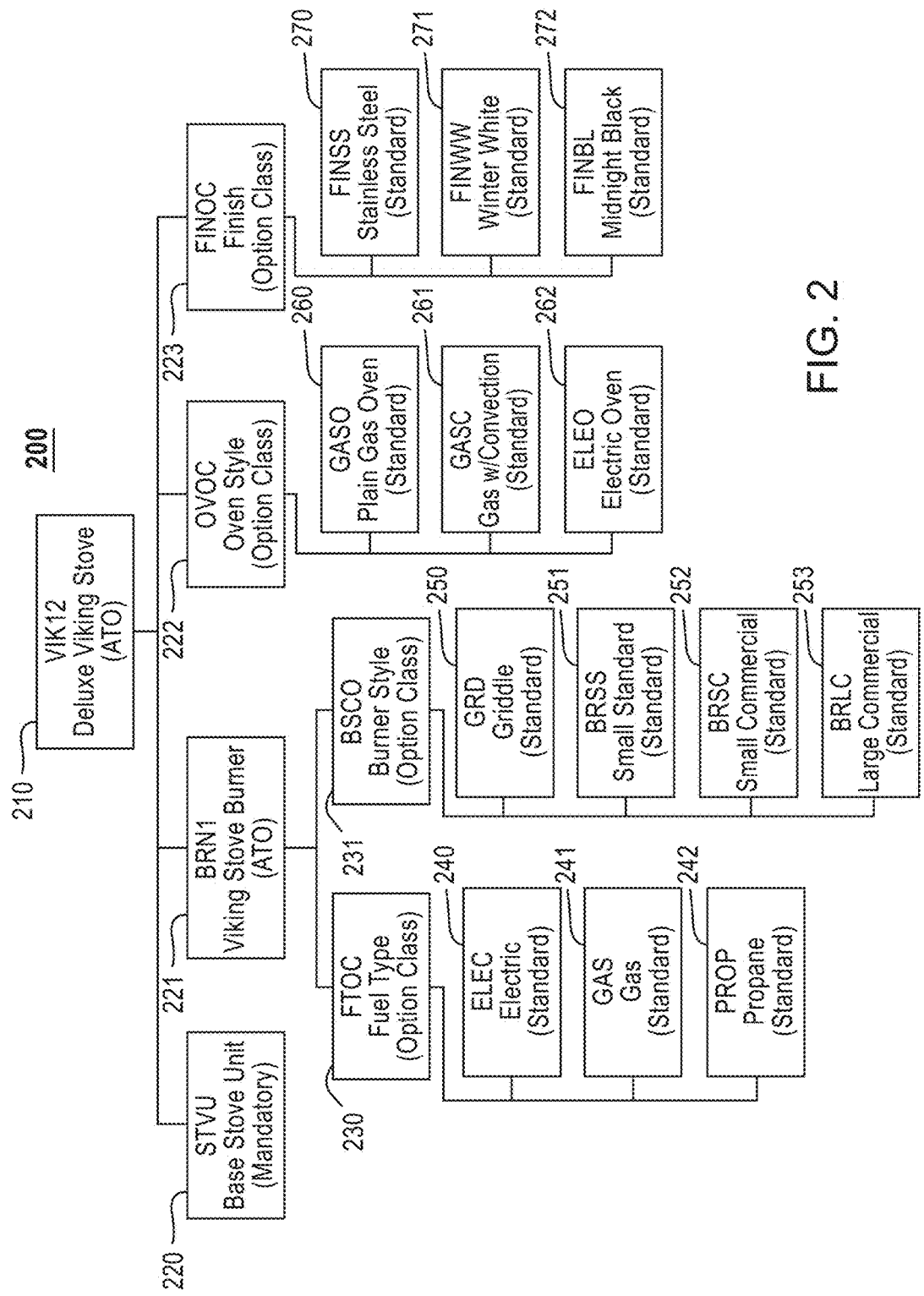
FIG. 2 illustrates an example bill of material for an item, according to an embodiment of the invention.

FIG. 2 illustrates an example bill of material 200 for an item, according to an embodiment of the invention. According to an embodiment, an external system can receive an order for an item, where an item is a "configure-to-order item" (also identified as an "assemble-to-order item"). A "configure-to-order item" is an item that comprises one or more components, where a component can be a manufactured item part that has not been assembled, or an item feature that has not been configured for a specific item, and one or more sub-components, where a sub-component is a configuration option of a component. Once the configure-to-order item is ordered via an order capture process, the item can be quickly assembled and/or configured as part of the order fulfillment process, and the item can be sent to the customer. For example, a user can purchase a laptop using an order capture system, and the user can select options such as processor speed, memory size, hard drive space, and accessories to build the exact laptop they want. In backend systems, the item and its components can be represented by a bill of material, where a bill of material is a list of all the parts and assemblies required to build a complete item. Thus, when the order is placed and processed, various order capture and fulfillment systems can maintain the order's configuration during order consumption. As is described below in greater detail, an "item configuration" of a configure-to-order item can be based on a bill of material, and can have a similar or identical structure to a bill of material for a configure-to-order item.

According to the illustrated embodiment, bill of material 200 is a bill of material for a VIKING® stove, which is a configure-to-order item. Bill of material 200 includes an item header 210, which represents a base item (i.e., a VIKING® stove), and item components 220, 221, 222, and 223, which represent parts or features of the base item. Further, bill of material 200 further include item sub-components 230, 231, 240, 241, 242, 250, 251, 252, 253, 260, 261, 262, 270, 271, and 272 which represent configuration options for item components 221, 222, and 223, respectively. More specifically, item component 220 can represent a base stove unit for the VIKING® stove, which can be a mandatory component. Item component 221 can represent a burner for the VIKING® stove, which itself is a configure-to-order item. Further, item sub-components 230 and 231 can represent a fuel type and burner style for the burner, respectively, item sub-components 240, 241, and 242 can represent fuel type configuration options for the burner (i.e., electric, gas, or propane), and item sub-components 250, 251, 252, and 253 can represent burner type configuration options for the burner (i.e., griddle, small standard, small commercial, or large commercial). Further, item component 222 can represent an oven style of the VIKING® stove, and item sub-components 260, 261, and 262 can represent oven style configuration options (i.e., plain gas oven, gas with convection, or electric oven). Additionally, item component 223 can represent a finish of the VIKING® stove, and item sub-components 270, 271, and 272 can represent finish configuration options (i.e., stainless steel, winter white, or midnight black). Thus, bill of material 200 represents the possible configuration options for a VIKING® stove.

Figure 3:
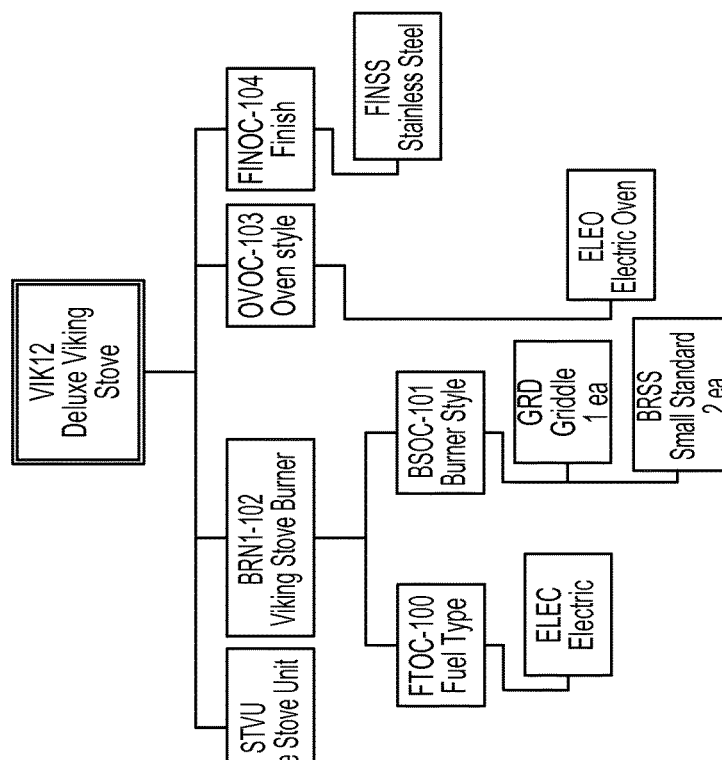
FIG. 3 illustrates a comparison of a bill of material for a match repository and a bill of material for a new order, according to an embodiment of the invention.
Figure 3:
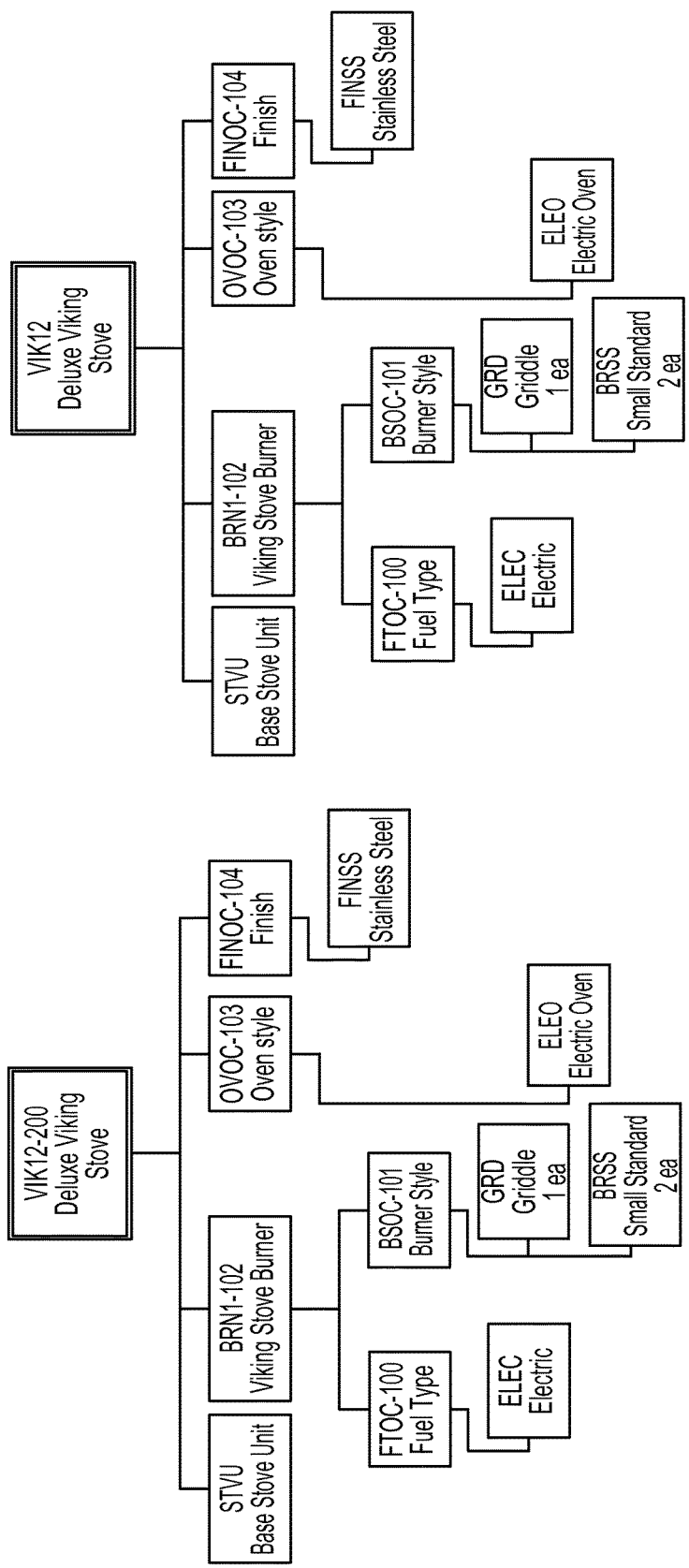

FIG. 3 illustrates a comparison of a bill of material for a match repository 300 and a bill of material for a new order 310, according to an embodiment of the invention. According to the embodiment, a match repository (such as match repository 300) is a storage or database record that can store item configurations that represent bills of material for one or more items that have been previously ordered. In the illustrated embodiment, match repository 300 stores an item configuration that represents a bill of material for a VIKING® stove with specific configuration options. When a new order for an item is received (such as new order 310), match repository 300 is searched, and an item configuration that represents a bill of material for the item is compared to the item configurations that represent the one or more bills of material stored within match repository 300. Thus, two bills of material can be compared, bottom-upwards, level-by-level to determine if the item (including the selected options of the item) of the new order is identical to an item (including the selected options of the item) of a previous order. In the illustrated embodiment, new order 310 stores an item configuration that represents a bill of material for a VIKING® stove with specific configuration options, where the item configuration that represents the bill of material for new order 310 is identical to the item configuration that represents the bill of material stored within match repository 300. If the item configuration that represents the bill of material for new order 310 matches an item configuration that represents a bill of material stored within match repository 300, this indicates that the item has been previously ordered, and that the item configuration is stored within match repository 300. Thus, it is not necessary to create the item (i.e., the item configuration) once again. The searching, comparing, and matching are described below in greater detail.

According to one embodiment, a supply chain orchestration system can create a configuration item identity for each unique configuration of a configure-to-order item, and can further store the configuration item identity within a data storage, such as a database. The supply chain orchestration system can further re-use the configuration item identity when processing a subsequent order, if the exact configuration of the configure-to-order item is ordered again. Thus, when an order capture system sends an order to the supply chain orchestration system, where the order references a configure-to-order item, the supply chain orchestration system can first check to see if the exact configuration of the configure-to-order item has been previously ordered. If the exact configuration of the configure-to-order item has been previously ordered, a stored configuration item identity is retrieved and passed back to the order capture system, and a life cycle of the configure-to-order item can be tracked using the existing configuration item identity. If the exact configuration of the configure-to-order item has not been previously ordered, a method can be invoked, where the method creates a new configuration item identity for the new configuration of the configure-to-order item, and then passes the new configuration item identity to the order capture system, and a life cycle of the configure-to-order item can be tracked using the new configuration item identity. The method is further described below in greater detail in conjunction with FIG. 10.

According to the embodiment, an order capture system can send an order that references a configure-to-order item to the supply chain orchestration system using a payload, where a payload is a data structure that can include one or more attributes, and where each attribute can include a data value. The data value can describe an item header of the configure-to-order item, an item component of the configure-to-order item, an item-sub-component of the configure-to-order item, a transactional item attribute of the configure-to-order item, or some other aspect of the configure-to-order item. In one embodiment, the payload can be represented using an XML format. A payload is further described below in greater detail in conjunction with FIG. 4. The supply chain orchestration system can utilize an indexing and searching engine to perform a full-text search on the input XML payload, and then perform a search and compare within a match repository using an RDBMS. A match repository is further described below in greater detail in conjunction with FIG. 5. More specifically, the supply chain orchestration system can search and match data between the XML payload sent from the order capture system, and the data stored in the match repository, which is stored within the RBDMS.

In an embodiment, the supply chain orchestration system can create a match key by taking elements from the XML payload. The match key can be a string data value that is a combination of a key, a data value from the payload, and a delineator. In certain embodiments, the combination can optionally also include a connector. The match key can be stored along with the item configuration for any previously ordered item in the match repository. Further, the match keys (i.e., the string data values) can be either indexed or hash mapped. A match key is further described below in greater detail in conjunction with FIG. 6. Additionally, the supply chain orchestration system can provide transactional data elements to customers to pick and choose elements of the payload on which they wish to search and match. More specifically, a user can select at least one of a number of elements of the payload, or an arrangement of elements of the payload. Such elements include transactional item attributes, which are attributes of the item specific to the order transaction. A transactional item attribute can include an attribute name and an attribute value.

Figure 4:
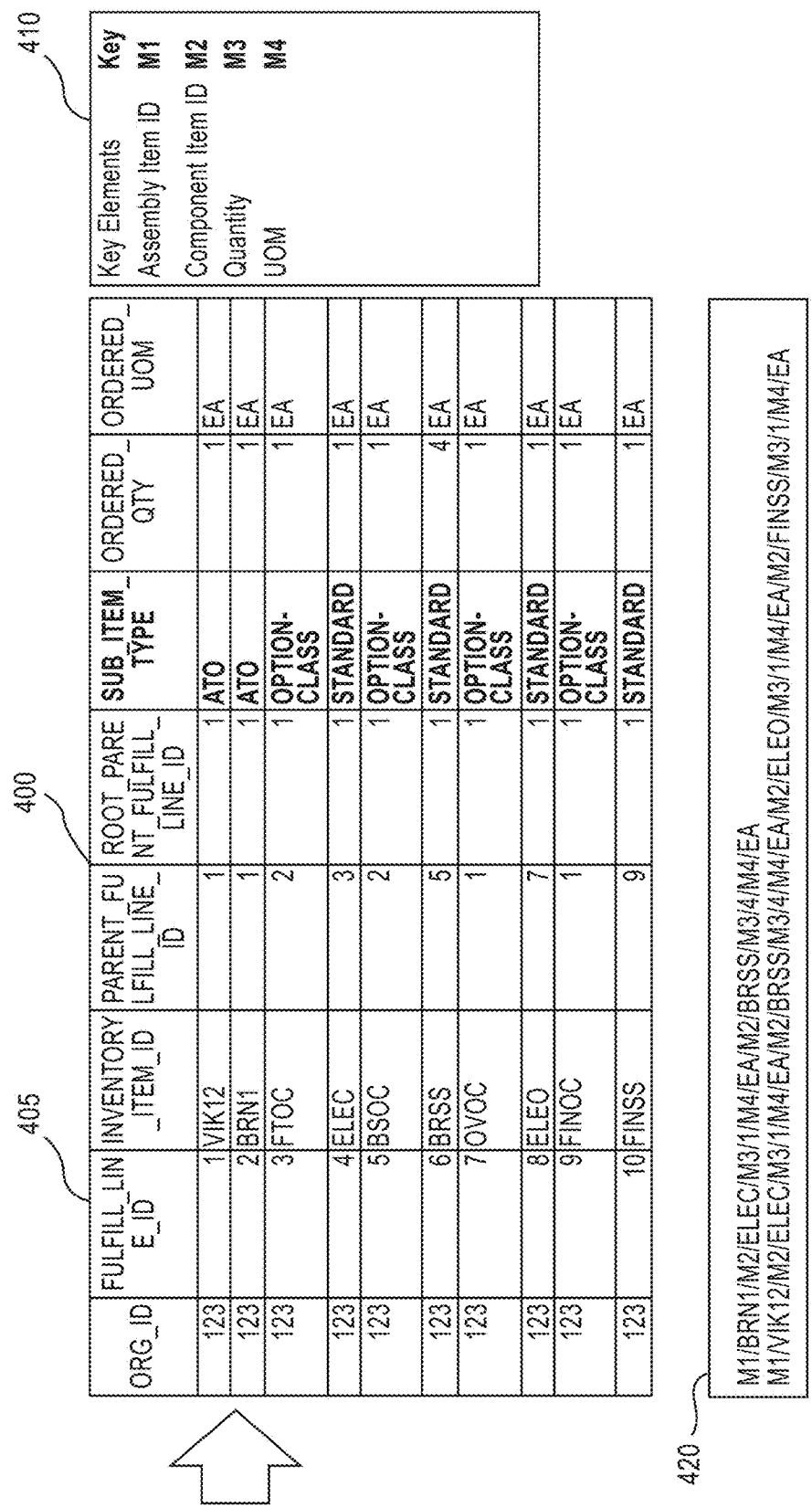
FIG. 4 illustrates an example payload of a new order, according to an embodiment of the invention.

FIG. 4 illustrates an example payload 400 of a new order, according to an embodiment of the invention. As previously described, an order capture system can send an order that references a configure-to-order item to the supply chain orchestration system using payload 400, where payload 400 is a data structure that includes a plurality of attributes, and where each attribute includes a data value. According to the illustrated embodiment, payload 400 represents an order for a VIKING® stove, and is based on bill of material 200 of FIG. 2. More specifically, payload 400 includes ten fulfillment lines (i.e., fulfillment lines 1, 2, 3, 4, 5, 6, 7, 8, 9, and 10 at column 405). Fulfillment line 1 of payload 400 represents item header 210 of FIG. 2 (i.e., a VIKING® stove). Fulfillment line 2 of payload 400 represents item component 221 of FIG. 2 (i.e., a burner for the VIKING® stove). Fulfillment line 3 of payload 400 represents item sub-component (option class) 230 of FIG. 2 (i.e., a fuel type of the burner). Fulfillment line 4 of payload 400 represents item sub-component 240 of FIG. 2 (i.e., an electric fuel type configuration option for the burner). Fulfillment line 5 of payload 400 represents item sub-component (option class) 231 of FIG. 2 (i.e., a burner style of the burner). Fulfillment line 6 of payload 400 represents item sub-component 251 of FIG. 2 (i.e., a small standard configuration option for the burner). Fulfillment line 7 of payload 400 represents item component (option class) 222 of FIG. 2 (i.e., an oven style of the VIKING® stove). Fulfillment line 8 of payload 400 represents item sub-component 262 of FIG. 2 (i.e., an electric oven configuration option for the VIKING® stove). Fulfillment line 9 of payload 400 represents item component 223 of FIG. 2 (i.e., a finish of the VIKING® stove). Fulfillment line 10 of payload 400 represents item sub-component 270 (option class) of FIG. 2 (i.e., a stainless steel configuration option for the VIKING® stove.

FIG. 4 also illustrates a match key legend 410. Match key legend 410 can be used to map elements (i.e., data values) of payload 400 to keys to form a match key, where a match key can be used to match a configure-to-order item referenced in payload 400 to a configure-to-order item stored in a match repository. A match key is further described below in greater detail in conjunction with FIG. 6. In the illustrated embodiment, match key legend 410 indicates that an assembly item identity maps to "M1," a component item identity maps to "M2," a quantity maps to "M3," and a unit of measure ("UOM") maps to "M4." In one embodiment, an additional key element can be an inventory item identity.

FIG. 4 also illustrates a match key 420. As previously described, a match key (such as match key 420) is a string data value that can be formed from elements (i.e., data values) of payload 400, where match key 420 can be used to match a configure-to-order item referenced in payload 400 to a configure-to-order item stored in a match repository. Thus, match key 420 represents a configuration of the configure-to-order item referenced in payload 400. A match key is further described below in greater detail in conjunction with FIG. 6. In in the illustrated embodiment, match key 420 has the value "M1/BRN1/M2/ELEC/M3/1/M4/EA/M2/BRSS/M3/4/M4/EA," which represents item component 221 of FIG. 2 (i.e., a burner for the VIKING® stove), and the value "M1/VIK12/M2/ELEC/M3/1/M4/EA/M2/BRSS/M3/4/M4/EA/M2/ELEO/M3/1/M4/EA/M2/FI NSS/M3/1/M4/EA," which represents item header 210 of FIG. 2 (i.e., a VIKING® stove).

In one embodiment, the payload can be represented using an XML format. An example XML format of payload 400 is shown below.

```
<Payload>
    <Line Id >
    .......
        <Item> BRN1<Item>
            <Item>      FTOC</Item>
            <Sub Item>Option-Class</Sub Item>
            <Item>      BSOC<Item>
            <Sub Item>Option-Class</Sub Item>
        <Sub Item>ATO</Sub Item>
    </Line Id>
</Payload>
```

Further, in one embodiment, the order capture system can additionally send a transactional item attribute payload (not illustrated in FIG. 4). As previously described, a transactional item attribute is an attribute of the item that is specific to the order transaction, and a transactional item attribute can include an attribute name and an attribute value. An example transactional item attribute payload is shown below.

| Line Id | Attribute Name | Attribute Value |
|---|---|---|
| 1 | Color | Black |
| 1 | Finishing | Chrome |

Figure 5:
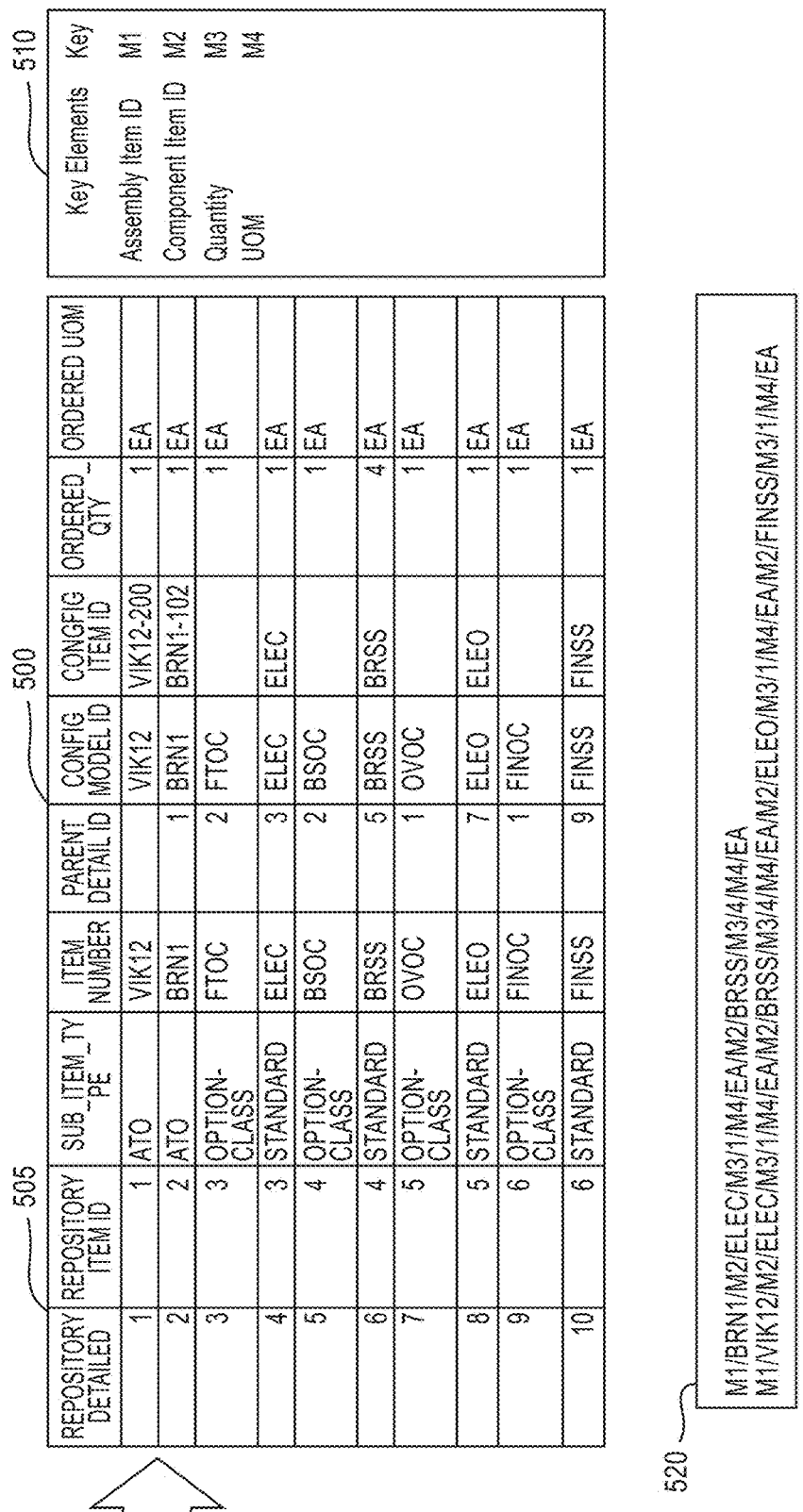
FIG. 5 illustrates an example match repository, according to an embodiment of the invention.

FIG. 5 illustrates an example match repository 500, according to an embodiment of the invention. As previously described, match repository 500 is a storage that can store one or more records that represent one or more configurations of one or more items that have been previously ordered. More specifically, match repository 500 includes ten repository details (i.e., repository details 1, 2, 3, 4, 5, 6, 7, 8, 9, and 10 at column 505). Repository detail 1 of match repository 500 represents item header 210 of FIG. 2 (i.e., a VIKING® stove). Repository detail 2 of match repository 500 represents item component 221 of FIG. 2 (i.e., a burner for the VIKING® stove). Repository detail 3 of match repository 500 represents item sub-component (option class) 230 of FIG. 2 (i.e., a fuel type of the burner). Repository detail 4 of match repository 500 represents item sub-component 240 of FIG. 2 (i.e., an electric fuel type configuration option for the burner). Repository detail 5 of match repository 500 represents item sub-component (option class) 231 of FIG. 2 (i.e., a burner style of the burner). Repository detail 6 of match repository 500 represents item sub-component 251 of FIG. 2 (i.e., a small standard configuration option for the burner). Repository detail 7 of match repository 500 represents item component (option class) 222 of FIG. 2 (i.e., an oven style of the VIKING® stove). Repository detail 8 of match repository 500 represents item sub-component 262 of FIG. 2 (i.e., an electric oven configuration option for the VIKING® stove). Repository detail 9 of match repository 500 represents item component (option class) 223 of FIG. 2 (i.e., a finish of the VIKING® stove). Repository detail 10 of match repository 500 represents item sub-component 270 of FIG. 2 (i.e., a stainless steel configuration option for the VIKING® stove.

FIG. 5 also illustrates a match key legend 510. Match key legend 510 can be used to map elements (i.e., data values) of a record of match repository 510 to keys to form a match key, where a match key can be used to match a configure-to-order item stored in match repository 500 to a configure-to-order item referenced in a payload. A match key is further described below in greater detail in conjunction with FIG. 6. In the illustrated embodiment, match key legend 510 indicates that an assembly item identity maps to "M1," a component item identity maps to "M2," a quantity maps to "M3," and a unit of measure ("UOM") maps to "M4." In one embodiment, an additional key element can be a sub item type.

FIG. 5 also illustrates a match key 520. As previously described, a match key (such as match key 520) is a string data value that can be formed from elements (i.e., data values) of match repository 500, where match key 520 can be used to match a configure-to-order item stored in match repository 500 to a configure-to-order item referenced in a payload. Thus, match key 520 represents a configuration of the configure-to-order item stored in match repository 500. A match key is further described below in greater detail in conjunction with FIG. 6. In in the illustrated embodiment, match key 520 has the value "M1/BRN1/M2/ELEC/M3/1/M4/EA/M2/BRSS/M3/4/M4/EA," which represents item component 221 of FIG. 2 (i.e., a burner for the VIKING® stove), and the value "M1/VIK12/M2/ELEC/M3/1/M4/EA/M2/BRSS/M3/4/M4/EA/M2/ELEO/M3/1/M4/EA/M2/FINSS/M3/1/M4/EA," which represents item header 210 of FIG. 2 (i.e., a VIKING® stove).

Figure 6:
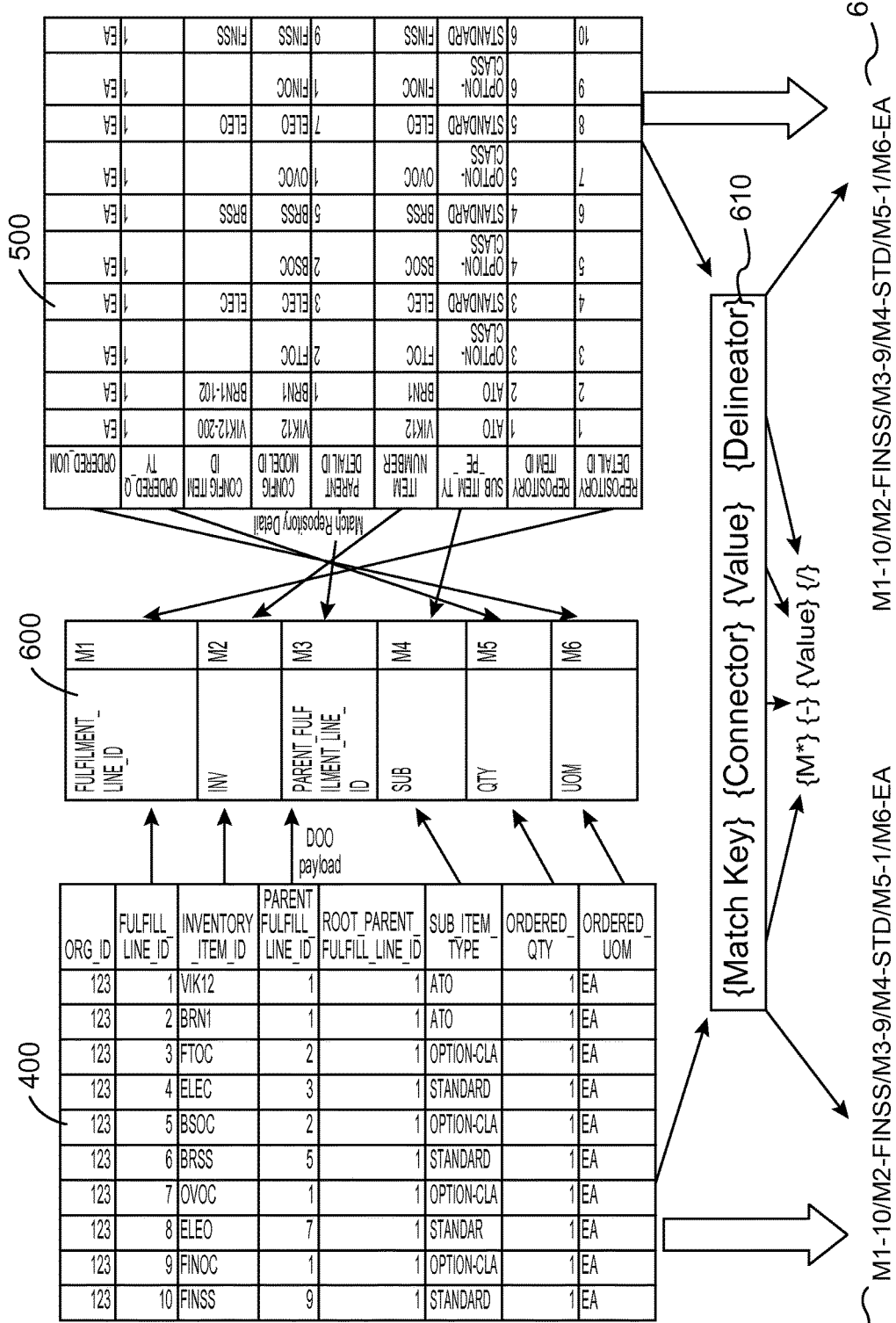
FIG. 6 illustrates an example match key format used to match a record of a payload to a record of a match repository, according to an embodiment of the invention.

FIG. 6 illustrates an example match key format 610 used to match a record of payload 400 to a record of match repository 500, according to an embodiment of the invention. As previously described, a match key is a string data value. According to the illustrated embodiment, elements (i.e., data values) from payload 400 can be selected and a valid relationship can be created for each element of payload 400 to a corresponding element of match repository 500. An example relationship of an element of payload 400 and a corresponding element of match repository 500 is shown below.

| XML/Payload | RDBMS/Match Repository | Key |
| --- | --- | --- |
| FULFILLMENT_LINE_ID | REPOSITORY_DETAIL_ID | M |

Further, an example relationship set including multiple elements of payload 400 and their corresponding elements of match repository 500 is also shown below.

| XML/Payload | RDBMS/Match Repository | Key |
| --- | --- | --- |
| FULFILLMENT_LINE_ID | REPOSITORY_DETAIL_ID | M1 |
| INVENTORY_ITEM_ID | ITEM_NUMBER | M2 |
| PARENT_FULFILLMENT_LINE_ID | PARENT_DETAIL_ID | M3 |
| SUB_ITEM_TYPE | SUB_ITEM_TYPE | M4 |
| ORDERED_QTY | ORDERED_QTY | M5 |
| ORDERED_UOM | ORDERED_UOM | M6 |

The above example relationship set is also illustrated in FIG. 6 as relationship set 600. Further, relationship set 600 can be used to construct a match key using match key format 610, where match key format 610 is a string data value format that is a combination of a key, a connector, a data value from either payload 400 or match repository 500, and a delineator (i.e., {Key} {Connector} {Value} {Delineator}). An example match key format and an example match key is shown below.
Match Key Format: {M1} {-} {Value} {/}
Match Key: M1-10/M2-FINSS/M3-9/M4-STD/M5-1/M6-EA Thus, match key format 610 can be used to create match keys 620 and 630, where match keys 620 and 630 are string data values. Match key 620 is a match key that represents an item configuration contained within a record of payload 400, and match key 630 is a match key that represents an item configuration contained within a record of match repository 500. According to the embodiment, a supply chain orchestration system can compare match keys 620 and 630, and can determine that match keys 620 and 630 are identical (i.e., that match keys 620 and 630 match). Thus, the supply chain orchestration system can determine that the configuration of the configure-to-order item contained within the record of payload 400 and the configuration of the configure-to-order item contained within the record of match repository 500 are identical, and therefore, the configure-to-order item referenced in the order that is sent to the supply chain orchestration system has been previously ordered. Similarly, in conjunction with FIGS. 4 and 5, the supply chain orchestration system can compare match key 420 of FIG. 4 and match key 520 of FIG. 5, and can determine that match keys 420 and 520 are identical (i.e., that match keys 420 and 520 match).

In one embodiment, match keys can be either index or hash mapped, so that the match keys can be efficiently and effectively matched between a payload and existing match repository records. Also in one embodiment, a match key can provide configuration options to users to select the elements of either the payload or the match repository on which they want to search and match. More specifically, a user can select a number of transactional item attributes to be included in either the payload or the match repository. An interrelationship dependency can also be supported when building a match key by introducing more match key elements and their relationships with either a payload or an existing match repository record. From the payload, a supply chain orchestration system can determine one or more parent/child relationships, and the supply chain orchestration system can perform a search from a bottom of a hierarchy, and move upwards within the hierarchy.

Figure 7:
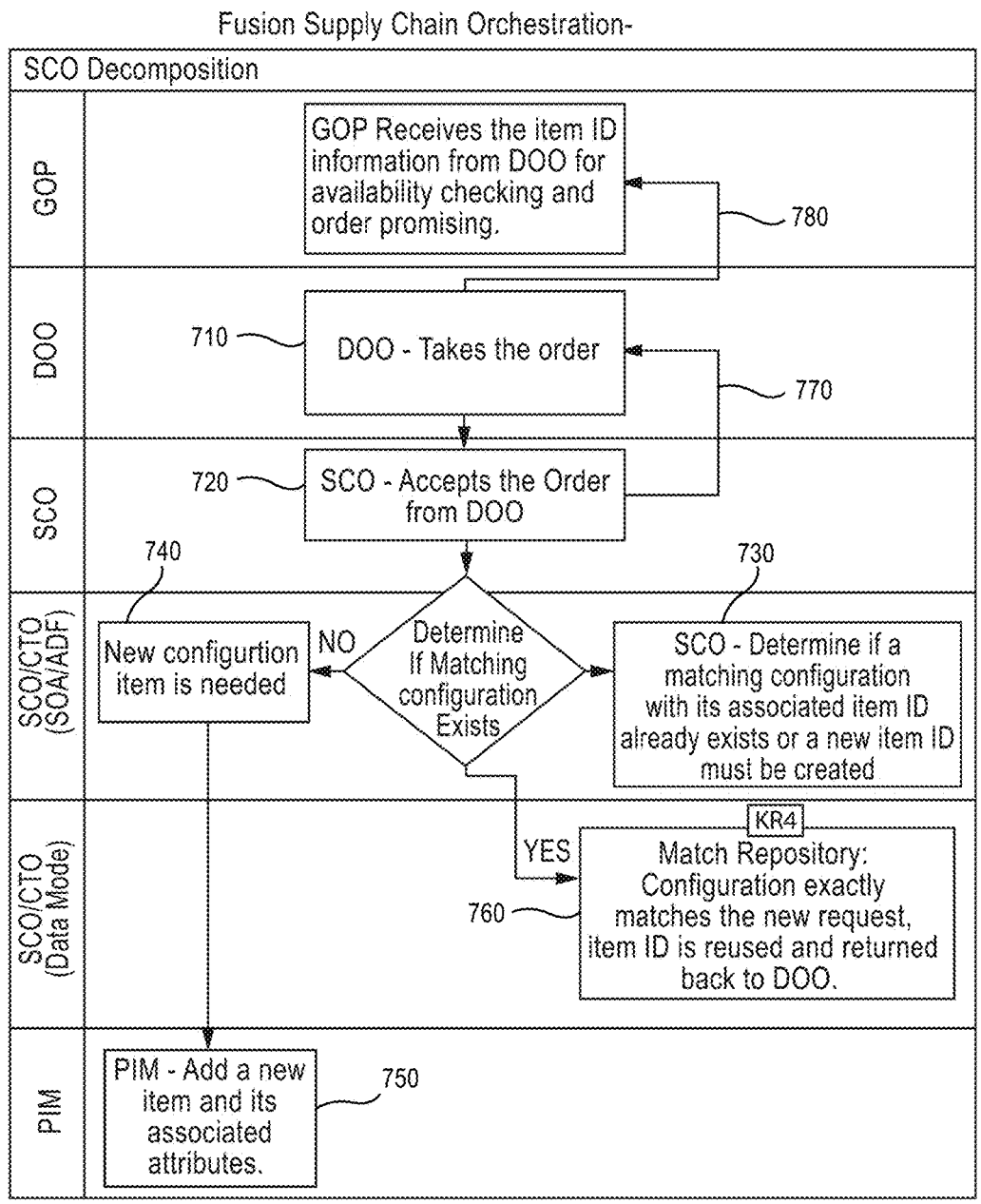
FIG. 7 illustrates a flow diagram of the functionality of a supply chain orchestration matching module, according to an embodiment of the invention.
Figure 10:
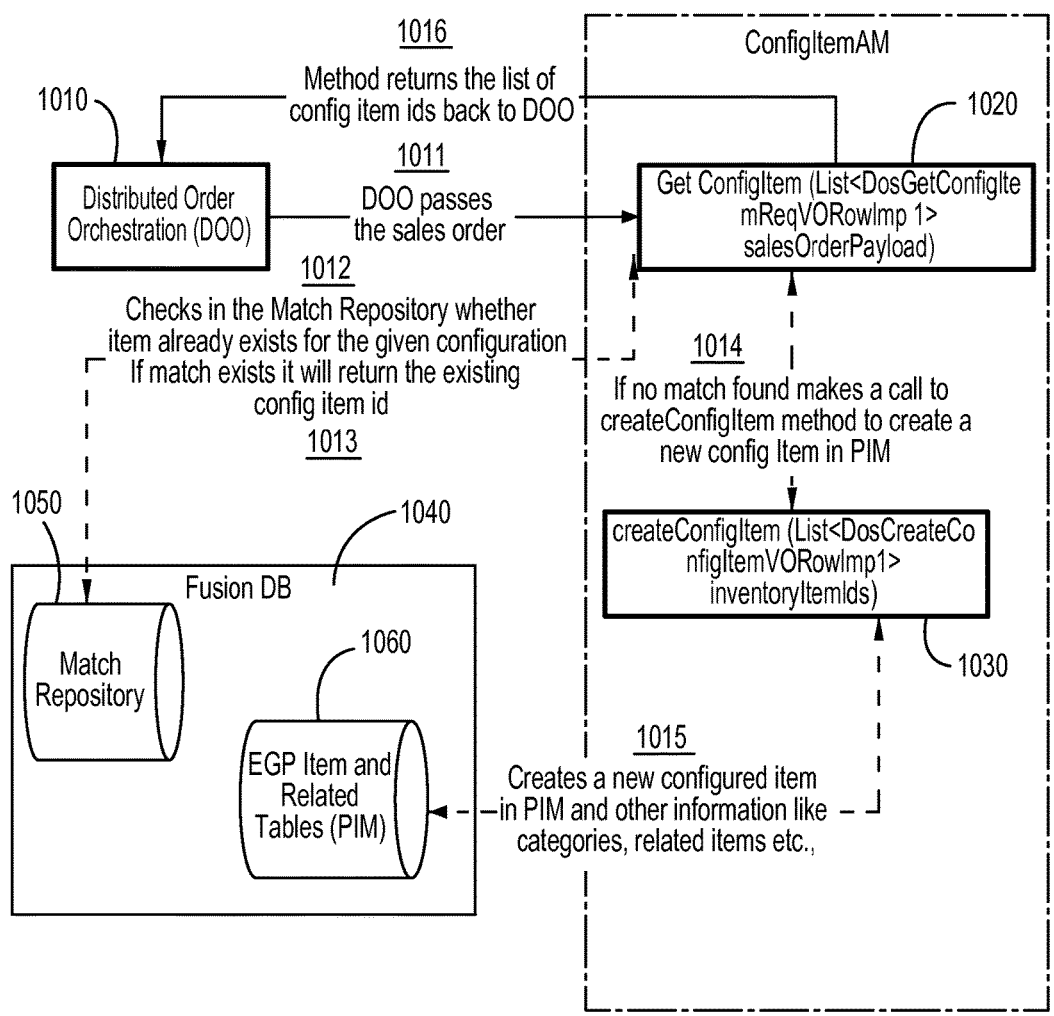
FIG. 10 illustrates a flow diagram of the functionality of a supply chain orchestration matching module, according to another embodiment of the invention.

FIG. 7 illustrates a flow diagram of the functionality of a supply chain orchestration matching module (such as supply chain orchestration matching module 16 of FIG. 1), according to an embodiment of the invention. In one embodiment, the functionality of the flow diagram of FIG. 7, as well as the functionality of the flow diagram of FIG. 8, and the functionality of the flow diagram of FIG. 10, are each implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

The flow begins at 710, and at 710, an order capture system sends an order (initiated by a customer) to a distributed order orchestration system ("DOO'), where the distributed order orchestration system receives the order. The order can be an order for a configure-to-order item. More specifically, the order can be an order for a specific configuration of the configure-to-order item. The distributed order orchestration system can then send the order to a system, such as a supply chain orchestration system ("SCO"). The format of the order can be a payload that includes one or more data values, where the one or more data values can represent an item configuration of the configure-to-order item. The format of the payload can be an XML format. Further, in an alternate embodiment, the order can be received and a payload can be generated based on the received order. The flow then proceeds to 720. At 720, the system receives the order from the distributed order orchestration system and accepts the order. Where the format of the order is a payload that includes one or more data values, the system can validate the one or more data values before accepting the payload (and thus, the order). The flow then proceeds to 730.

At 730, the system determines if a matching item configuration of a configure-to-order item (including its associated configuration item identity) already exists or whether a new configuration item identity must be created. The system can determine this by invoking a service that compares the item configuration stored within the payload with one or more item configurations stored within a match repository, where the one or more item configurations stored within the match repository represent previously ordered item configurations. The service is described below in greater detail in conjunction with FIG. 10. If a matching item configuration does not exist, the flow proceeds to 740. If a matching item configuration does exist, the flow proceeds to 760. In one embodiment, the supply chain orchestration system can generate a match key for the payload that represents the item configuration of the payload (i.e., includes at least one data value of the payload), and compare the match key associated with the payload with one or more match keys that are stored within one or more records of the match repository, where each match key for each record represents an item configuration. Further, in an embodiment, the supply chain orchestration system can perform the generation of the match key and the comparing of the match key with one or more match keys in a volatile memory.

At 740, the system determines that no item configuration stored within the match repository matches the item configuration in the payload (i.e., the item configuration that is being requested). The flow then proceeds to 750.

At 750, the system generates a new item configuration along with a new configuration item identity. As previously described, an item configuration for a configure-to-order item can include an item header which represents a base item, one or more item components which represent one or more parts or features of the base item, and one or more item sub-components which represent configuration options for an item component of the base item. In certain embodiments, the item configuration can also include one or more transactional item attributes. The system then stores the new item configuration and the new configuration item identity within a database component of the system, such as a product information management component ("PIM"). Further, in one embodiment, the system can store the new item configuration and the new configuration item identity within the PIM by invoking a service that stores an item configuration and a configuration item identity within a PIM. The service is described below in greater detail in conjunction with FIG. 10. Additionally, in one embodiment, the new item configuration and the new configuration item identity can also be stored within the match repository. The system then returns the new configuration item identity back to the distributed order orchestration system. The flow then proceeds to 770.

At 760, the system determines that there is an item configuration stored within the match repository that matches the item configuration in the payload (i.e., the item configuration that is being requested). An item configuration for a configure-to-order item can include an item header which represents a base item, one or more item components which represent one or more parts or features of the base item, and one or more item sub-components which represent configuration options for an item component of the base item. In certain embodiments, the item configuration can also include one or more transactional item attributes. The system retrieves a configuration item identity associated with the item configuration from the match repository and returns the configuration item identity back to the distributed order orchestration system. The flow then proceeds to 770.

At 770, the distributed order orchestration system receives the configuration item identity and sends the configuration item identity to an order promising system, such as a global order promising system ("GOP") that is a source for generating supply recommendations for the order. The configuration item identity is either the new configuration item identity that is generated at 750 or the existing configuration item identity that is retrieved from the match repository at 760. The flow then proceeds to 780. At 780, the order promising system receives the configuration item identity from the distributed order orchestration system, and uses the configuration item identity for availability checking and order promising. The flow then ends.

Figure 8:
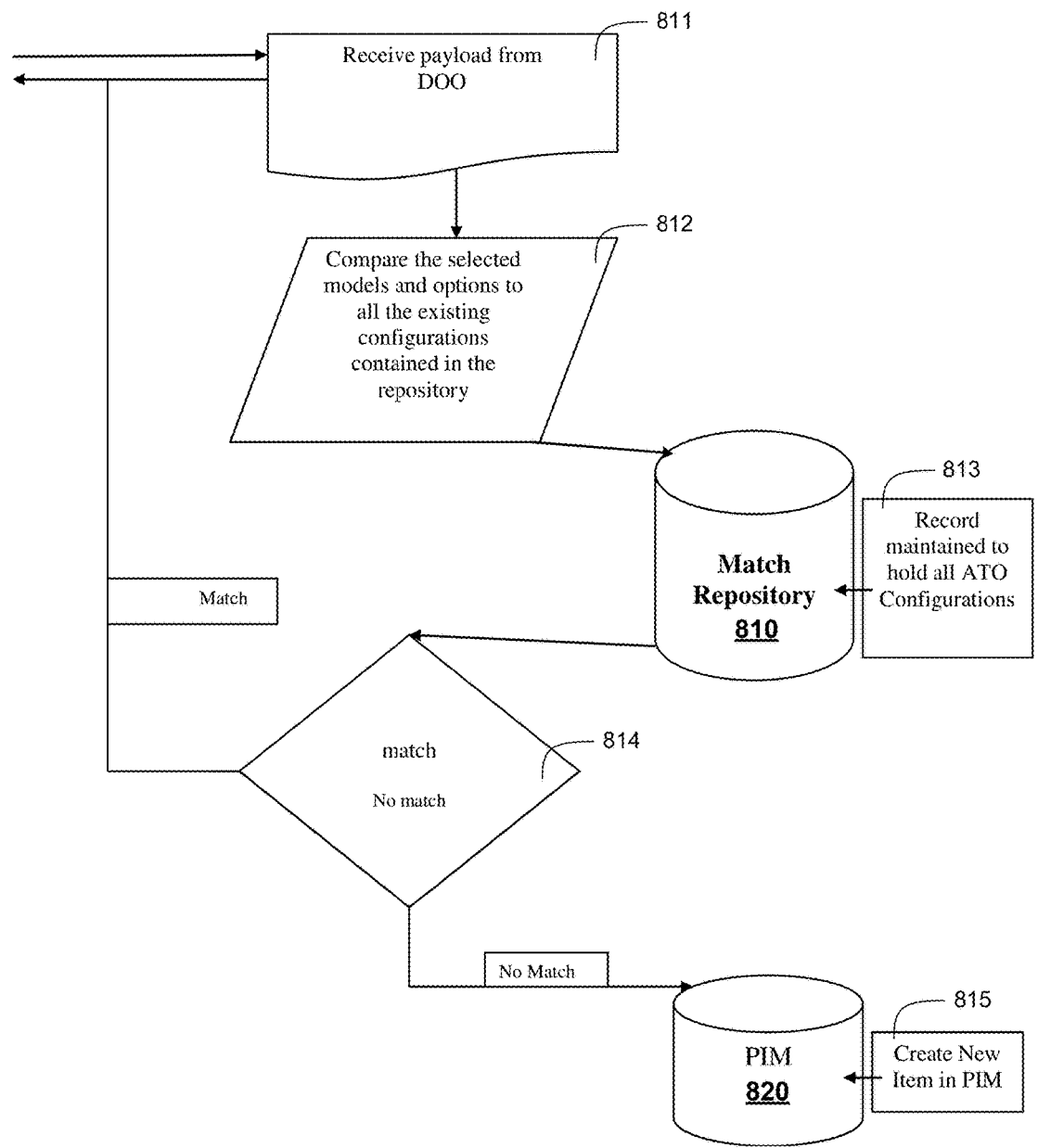
FIG. 8 illustrates a flow diagram of the functionality of a supply chain orchestration matching module, according to another embodiment of the invention.

FIG. 8 illustrates a flow diagram of the functionality of a supply chain orchestration matching module, according to another embodiment of the invention. The flow begins at 811, and at 811, a system (such as a supply chain orchestration system) receives a payload from an order orchestration system, such as a distributed order orchestration system. According to the embodiment, the payload is a data structure that includes a plurality of attributes, and where each attribute includes a data value. The data value can describe an item header of a configure-to-order item, an item component of the configure-to-order item, an item sub-component of the configure-to-order item, a transactional item attribute of the configure-to-order item, or some other aspect of the configure-to-order item. From the payload, a structure of a requested item configuration of the configure-to-order item can be derived. In one embodiment, the payload can be represented using an XML format. The flow then proceeds to 812.

At 812, the system compares the requested item configuration stored in the payload with one or more item configurations stored within a match repository 810, where the one or more stored item configurations represent previously selected item configurations. According to the embodiment, match repository 810 is a storage that can store one or more records that represent one or more configurations of one or more items that have been previously ordered. Thus, match repository 810 includes all previously ordered item configurations. According to the embodiment, the supply chain orchestration system can invoke a service at 813 to search through match repository 810 to see if a previous order referenced the same item configuration (i.e., the same base item and configuration options). The service is described below in greater detail in conjunction with FIG. 10. In one embodiment, the supply chain orchestration system can generate a match key for the payload that represents the item configuration of the payload, and compare the match key associated with the payload with one or more match keys that are stored within one or more records of match repository 810, where each match key for each record represents a previously ordered item configuration. Further, in an embodiment, the supply chain orchestration system can perform the generation of the match key and the comparing of the match key with one or more match keys in a volatile memory. The flow then proceeds to 814.

At 814, the supply chain orchestration system determines whether the match key associated with the payload matches any of the match keys associated with the records of match repository 810. In other words, the supply chain orchestration system determines if the item configuration contained within the payload matches any of the item configurations contained within match repository 810. If the match key associated with the payload matches any of the match keys associated with match repository 810, the supply chain orchestration system retrieves a configuration item identity associated with the matching item configuration stored within match repository 810, and returns the configuration item identity to the order orchestration system. The flow then ends. However, if the match key associated with the payload does not match any of the match keys associated with match repository 810, the flow proceeds to 815.

At 815, the supply chain orchestration system generates a new item configuration and stores the new item configuration within PIM 820. In one embodiment, the supply chain orchestration system can invoke a service to create a new item configuration in PIM 820. The service is further described below in greater detail in conjunction with FIG. 10. The supply chain orchestration system can further capture a configuration item identity generated by PIM 820 for the new item configuration, and can return the configuration item identity to the order orchestration system. Additionally, in one embodiment, the new item configuration and the new configuration item identity can also be stored within the match repository. The flow then ends.

Figure 9:
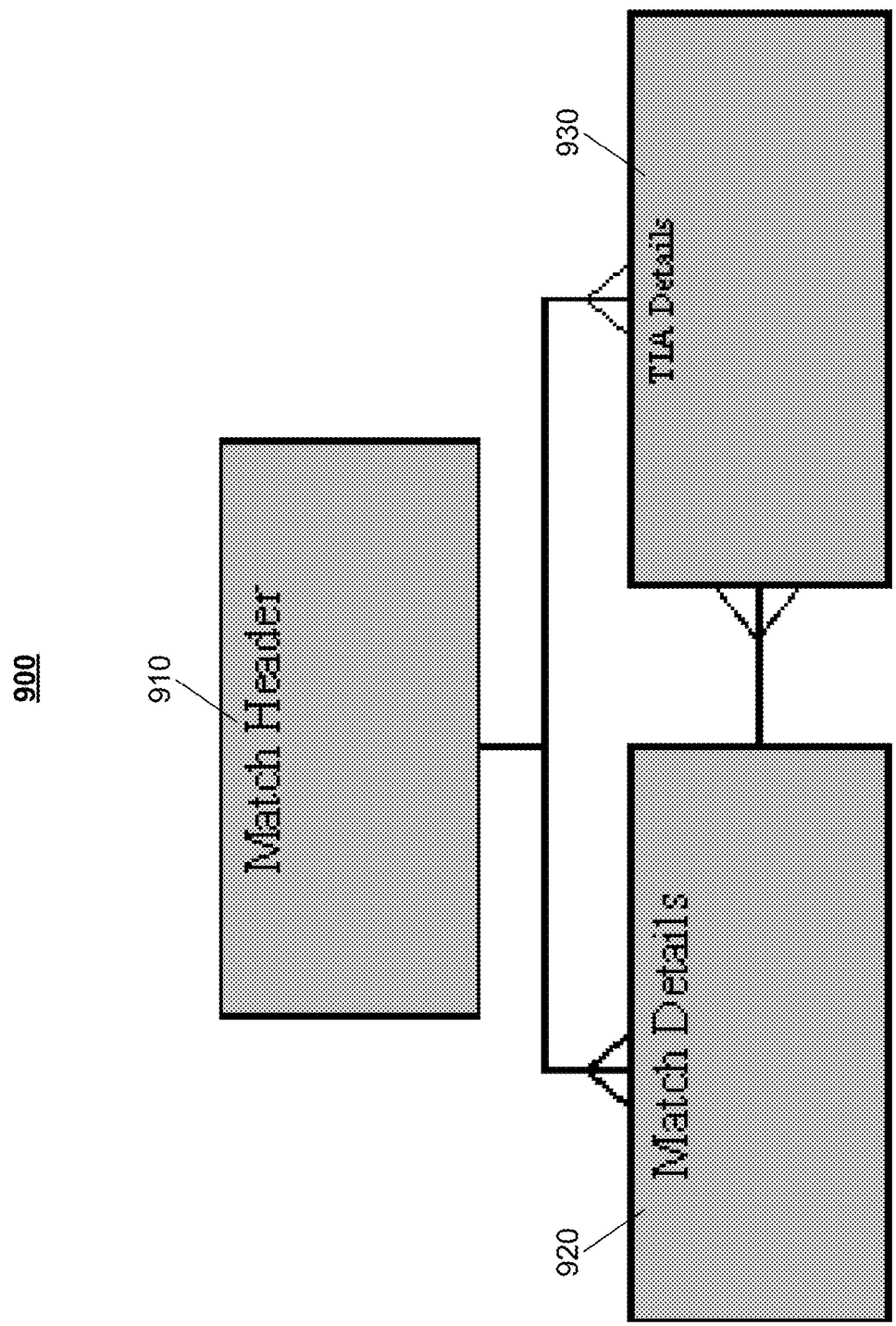
FIG. 9 illustrates a physical data model of a match repository, according to an embodiment of the invention.

FIG. 9 illustrates a physical data model 900 of a match repository, according to an embodiment of the invention. According to the embodiment, a match repository includes one or more records to hold all previously ordered item configuration. Each item configuration can be unique based on an associated configuration item identity. Similar to a bill of material structure, an item configuration structure can include multiple components at multiple levels which ultimately make up the final configure-to-order item. More specifically, the item configuration structure can include an item header, one or more item components, and one or more item sub-components. The match repository can maintain parent/child relationships between a base item, its item components, and item sub-components. In other words, each match record of a match repository can include a match header record, one or more match detail records, and one or more match transactional attribute detail records. Further, each match header record can include a match key.

According to the illustrated embodiment, physical data model 900 includes a match header 910 which stores a match header record for an item configuration, match details 920 which store one or more match detail records for an item configuration, and transactional item attribute details 930 which store one or more transactional item attribute details for an item configuration. Example database tables for physical data model 900 are shown below.

Tables

| Table Name | Comments |
| --- | --- |
| DOS_CTO_MATCH_HEADER | SCO Match Repository Header |

| Table Name | Comments |
| --- | --- |
| DOS_CTO_MATCH_DETAIL | SCO Match Repository Details |

| Table Name | Comments |
| --- | --- |
| DOS_CTO_MATCH_TXN_ATTR | SCO Match Repository TIA Details |

Indexes

| | Indexes | | |
| --- | --- | --- | --- |
| Table Name | Index Name | Column Name(s) | Unique/Not Unique |
| DOS_CTO_MATCH_HEADER | DOS_CTO_MATCH_HEADER_PK | HEADER_ID | UNIQUE |
| DOS_CTO_MATCH_LINE | DOS_CTO_MATCH_LINE_PK | LINE_ID | UNIQUE |
| DOS_CTO_MATCH_DETAIL | DOS_CTO_MATCH_LINE_FK1 | HEADER_ID | NOT UNIQUE |
| DOS_CTO_MATCH_TXN_ATTR | DOS_CTO_MATCH_TXN_ATTR_PK | REPOSITORY_TIA_ID | UNIQUE |

Physical Table: DOS_CTO_MATCH_HEADER
Columns
Columns

| Name | Type | Status | Description |
| --- | --- | --- | --- |
| HEADER_ID | NUMBER(18) | NOT NULL | Unique identifier assigned to the Match Header record entry |
| BASE_MODEL_ID | NUMBER(18) | NOT NULL | The item id of the ATO model or option class Item |
| CONFIG_ITEM_ID | NUMBER(20) | NOT NULL | Configured item's Inventory Item ID (EGP_SYSTEMS_ITEMS_B) (PK) |
| MASTER_ORGANIZA-TION_ID | NUMBER(10) | | Master ORGANIZATION_ID for config id |
| MATCH_KEY | VARCHAR 80 | | |

Primary Key - HEADER_ID

| Physical Table: DOS_CTO_MATCH_LINES | | | |
|---|---|---|---|
| Columns | | | |
| Columns | | | |
| Name | Type | Status | Description |
| LINE_ID | NUMBER(18) | NOT NULL | Unique identifier assigned to the Match Detail record entry |
| HEADER_ID | NUMBER(18) | NOT NULL | The related Match Header entry (parent for this child) |
| SUB_ITEM_TYPE* bom or item_type | NUMBER(18) | | Type of item, ie; model, option class or standard |
| INVENTORY_ITEM_ID | NUMBER(20) | | Item ID assigned to the model or option class item |
| PARENT_LINE_ID | NUMBER(10) | | Defines the relationship between the component item and its parent. |
| UNIT_QTY | NUMBER | | Quantity required for the configuration |
| UNIT_UOM | VARCHAR2 | | Unit of measure for the quantity ordered |

Primary Key - LINE_ID

| Physical Table: DOS_CTO_MATCH_TXN_ATTR | | | |
|---|---|---|---|
| Columns | | | |
| Columns | | | |
| Name | Type | Status | Description |
| HEADER_ID | NUMBER(18) | NOT NULL | Unique identifier assigned to the Match Header record entry for TIA information |
| LINE_ID | NUMBER(18) | NOT NULL | Unique identifier assigned to the Match Detail record entry |
| ATTRIBUTE_ID | NUMBER(20) | NOT NULL | Name Value pair of TIA (Name) |
| ATTRIBUTE_VALUE | VARCHAR 30 | | Name Value pair of TIA (Value) |
| MATCH_ENABLED | VARCHAR 2 | | Match Enabled (Yes/No) |

Primary Key - REPOSITORY_TIA_ID/HEADER_ID

FIG. 10 illustrates a flow diagram of the functionality of a supply chain orchestration matching module, according to another embodiment of the invention. The flow begins at 1011, where a distributed order orchestration system 1010 passes a sales order to a supply chain orchestration system. The sales order can be an order for a configure-to-order item. Distributed order orchestration system 1010 can send the order via a payload. The payload can include one or more data values. The format of the payload can be an XML format. The flow proceeds to 1012.

At 1012, the supply chain orchestration system invokes a method 1020, GetConfigItem (List<DosGetConfigItemReqVORRowImpl>salesOrder Payload). Method 1020 receives the payload that represents the sales order from distributed order orchestration system 1010, and checks in match repository 1050 whether an item configuration already exists for the item configuration contained within the payload (i.e., whether the item configuration contained within the payload matches an item configuration stored within match repository 1050). Match repository 1050 is stored within a database 1040. In one embodiment, method 1020 can generate a match key for the payload that represents the item configuration of the payload, and compare the match key associated with the payload with one or more match keys that are stored within one or more records of match repository 1050, where each match key for each record represents a previously ordered item configuration. Further, in an embodiment, method 1020 can perform the generation of the match key and the comparing of the match key with one or more match keys in a volatile memory. The flow then proceeds to either 1013 if a match exists, or 1014 if no match is found.

At 1013, if a match exists, method 1020 retrieves a configuration item identity of the item configuration stored within match repository 1050 that matches the item configuration contained within the payload. The flow then proceeds to 1016.

At 1014, if no match is found, method 1020 invokes a method 1030, createConfigItem (List<DosCreateConfigItemVORowImpl>inventoryItemIds). Method 1030 generates a new item configuration and stores the new item configuration within PIM 1060. The flow then proceeds to 1015.

At 1015, method 1030 generates a new item configuration and stores the new item configuration within PIM 1060. The generation of a new item configuration can include generating a configuration item identity. The supply chain orchestration system receives the configuration item identity from PIM 1060 and stores the new item configuration and the configuration item identity in match repository 1050. The flow then proceeds to 1016.

At 1016, the supply chain orchestration system returns the configuration item identity to distributed order orchestration system 1010. The configuration item identity is either the existing configuration item identity that is retrieved from match repository 1050 at 1013, or the new configuration item identity that is generated at 1015. The flow then ends.

Thus, in one embodiment, a supply chain orchestration system can search and match data between an XML payload and a match repository stored in a RDBMS. More specifically, the supply chain orchestration system can receive an order that is a request for a specific configuration of an item, and can check to see if the exact same configuration has been ordered before. If the configuration has been ordered before, a configuration item identity of the specific configuration can be re-used and passed back to the order. For the life of that order, the configuration can be tracked by the existing configuration item identity. If a match is not found, a call can be made to create a new configuration item identity. This can efficiently manage a size of an item master list. Further, a variety of complex data structure can be implemented in databases to facilitate fast retrieval of data based on key fields. Additionally, various types of indices can be built for certain key words or fields that are frequently queried in a database to enable fast searching on those words and fields. Thus, the searching and matching provided by the supply chain orchestration system can be highly efficient, and overall processing time can be reduced.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A computer-readable non-transitory medium having instructions stored thereon that, when executed by a processor, cause the processor to search and match data, the searching and matching comprising:
    receiving an XML (Extensible Markup Language) payload comprising a data value representing an item configuration;
    generating a first match key for the payload that comprises the data value;
    comparing the first match key with a second match key stored in a match repository using a relational database management system;
    retrieving a configuration item identity from the match repository when the first match key exactly matches the second match key, wherein the configuration item identity represents a previously ordered item configuration;
    generating a new configuration item identity when the first match key does not match the second match key, wherein the new configuration item identity represents the item configuration; and
    fulfilling an order based on the retrieved or the new configuration item identity and wherein the retrieved or new configuration item identity comprises a value separate and distinct from the first and second match key.

2. The computer-readable non-transitory medium of claim 1, the searching and matching further comprising:
    receiving the order for the item configuration; and
    generating the payload.

3. The computer-readable non-transitory medium of claim 1, the searching and matching further comprising configuring a transactional item attribute data value that is contained within the first match key.

4. The computer-readable non-transitory medium of claim 1, wherein the generating the first match key and the comparing the first match key with the second match key is performed in volatile memory.

5. The computer-readable non-transitory medium of claim 1, wherein the first match key comprises a combination of a key, a data value of the payload, and a delineator.

6. The computer-readable non-transitory medium of claim 1, the searching and matching further comprising storing the new configuration item identity and the item configuration within a database.

7. The computer-readable non-transitory medium of claim 1, the searching and matching further comprising storing the new configuration item identity and the item configuration within the match repository.

8. The computer-readable non-transitory medium of claim 7, wherein the match repository is stored within a database.

9. The computer-readable non-transitory medium of claim 8,
    wherein the match repository comprises a match record comprising configuration options, including a match header record, a match detail record, and a match transactional item attribute detail record; and
    wherein each match header record comprises a match key.

10. The computer-readable non-transitory medium of claim 1, wherein an item configuration comprises an item header that represents a base item, an item component that represents a part or feature of the base item, and an item sub-component that represents a configuration option for the item component.

11. A computer-implemented method for searching and matching data, the computer-implemented method comprising:
    receiving, by a computer processor, an XML (Extensible Markup Language) payload comprising a data value representing an item configuration;
    generating, by the computer processor, a first match key for the payload that comprises the data value;
    comparing, by the computer processor, the first match key with a second match key stored in a match repository using a relational database management system;
    retrieving, by the computer processor, a configuration item identity from the match repository when the first match key exactly matches the second match key, wherein the configuration item identity represents a previously ordered item configuration;
    generating, by the computer processor, a new configuration item identity when the first match key does not match the second match key, wherein the new configuration item identity represents the item configuration; and fulfilling an order based on the retrieved or the new configuration item identity and wherein the retrieved or new configuration item identity comprises a value separate and distinct from the first and second match key.

12. The computer-implemented method of claim 11, the searching and matching further comprising configuring a transactional item attribute data value that is contained within the first match key.

13. The computer-implemented method of claim 11, wherein the generating of the first match key and the comparing the first match key with the second match key is performed in volatile memory.

14. The computer-implemented method of claim 11, wherein the first match key comprises a combination of a key, a data value of the payload, and a delineator.

15. The computer-implemented method of claim 11, wherein an item configuration comprises an item header that represents a base item, an item component that represents a part or feature of the base item, and an item sub-component that represents a configuration option for the item component.

16. A system, comprising:
a processor configured to execute a collection of software modules, wherein the processor is further configured, when executing the collection of software modules, to:
receive an XML (Extensible Markup Language) payload comprising a data value representing an item configuration;
generate a first match key for the payload that comprises a data value;
compare the first match key with a second match key stored in a match repository using a relational database management system;
retrieve a configuration item identity from the match repository when the first match key exactly matches the second match key stored in the match repository, wherein the configuration item identity represents a previously ordered item configuration;
generate a new configuration item identity when the first match key does not match the second match key, wherein the new configuration item identity represents the item configuration; and
fulfill an order based on the retrieved or the new configuration item identity and wherein the retrieved or new configuration item identity comprises a value separate and distinct from the first and second match key.

17. The system of claim 16, further comprising generating a transactional item attribute data value that is contained within the first match key.

18. The system of claim 16, wherein the first match key is stored in volatile memory, and
wherein the first match key is compared to the second match key stored in volatile memory.

19. The system of claim 16, wherein the first match key comprises a combination of a key, a data value of the payload, and a delineator.

20. The system of claim 16, wherein an item configuration comprises an item header that represents a base item, an item component that represents a part or feature of the base item, and an item sub-component that represents a configuration option for the item component.

21. The system of claim 16, further comprising updating the match repository with the new configuration item identity.

* * * * *

UNITED STATES PATENT AND TRADEMARK OFFICE
CERTIFICATE OF CORRECTION

PATENT NO. : 9,767,499 B2  
APPLICATION NO. : 14/040631  
DATED : September 19, 2017  
INVENTOR(S) : Daniel et al.

Page 1 of 1

It is certified that error appears in the above-identified patent and that said Letters Patent is hereby corrected as shown below:

In the Drawings

On sheet 7 of 10, in Fig. 7, under Reference Numeral 740, Line 1, delete "configurtion" and insert -- configuration --, therefor.

Signed and Sealed this  
Twenty-second Day of May, 2018

Andrei Iancu  
*Director of the United States Patent and Trademark Office*